Figure 1:
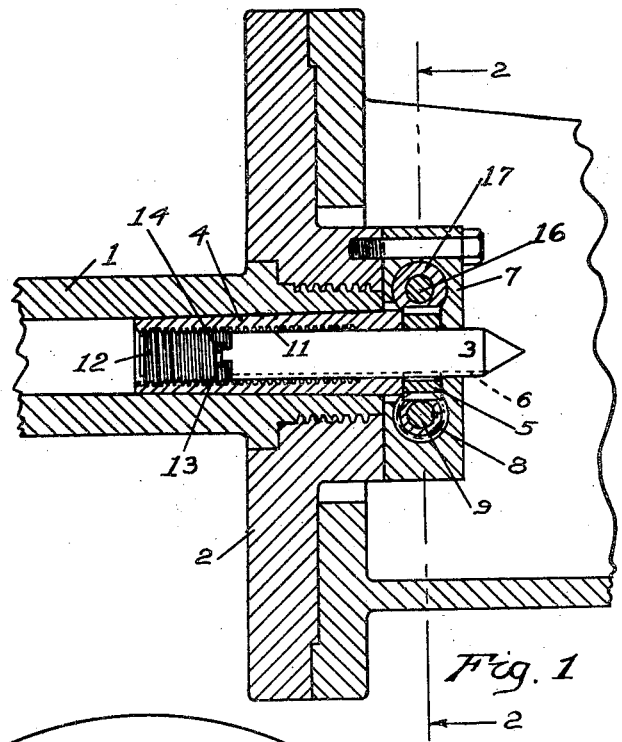

Nov. 4, 1924.

F. S. FLOETER 1,513,899

EXTENSIBLE HEADSTOCK CENTER FOR LATHES

Filed July 3, 1922

Frederich S. Floeter
INVENTOR

BY
Geo. B. Willcox
ATTORNEY

Patented Nov. 4, 1924.

1,513,899

UNITED STATES PATENT OFFICE.

FREDERICK S. FLOETER, OF SAGINAW, MICHIGAN, ASSIGNOR TO WICKES BROTHERS, OF SAGINAW, MICHIGAN, A CORPORATION OF MICHIGAN.

EXTENSIBLE HEADSTOCK CENTER FOR LATHES.

Application filed July 3, 1922. Serial No. 572,752.

*To all whom it may concern:*

Be it known that I, FREDERICK S. FLOETER, a citizen of the United States, residing at Saginaw, in the county of Saginaw and State of Michigan, have invented certain new and useful Improvements in Extensible Headstock Centers for Lathes; and I do hereby declare the following to be a full, clear, and exact description of the invention, such as will enable others skilled in the art to which it appertains to make and use the same.

This invention relates to head stock centers for lathes and pertains more particularly to the arrangement of a head stock center in a lathe spindle whereby the center may be projected outwardly from the lathe spindle or retracted toward it, making in effect an extensible or horizontally adjustable lathe center.

My improvement further provides means for quickly and accurately accomplishing the lengthwise adjustment of the center from a convenient position in front of the face-plate and also provides means for automatically supporting or backing the end of the center spindle so that the center will be capable of withstanding any required amount of longitudinal thrust from the work. Hence the spindle, in whatever adjusted position it may be set, will be rigidly backed or supported at its rear end and will not yield when subjected to endwise pressure of the work, produced by the tightening of the tail-stock screw.

My invention is particularly well adapted for use on lathes employed for cutting the wrist pins and shaft bearings of engine crank shafts and the like, where the cutting tool by which the bearing is turned must occupy a certain longitudinal position with respect to the length of the work. For example, the bearing of an automobile crank shaft must always be the same distance from the ends of the shaft; consequently in lathes of this kind the cutting tool usually has a fixed longitudinal position. The shaft to be machined is placed in the lathe with a bearing which is to be turned directly in front of the tool. The tail-stock has to be run up to enter the tail-stock center into the center recess at the tail end of the shaft, and that is the usual practice, but it has heretofore been difficult to properly enter the head-stock center into the centering recess on the head end of the shaft because successive shafts are not usually of the same length from the shaft end to the center of the bearing.

With lathes having head-stock centers that are non-adjustable it has usually been customary to first enter the head-stock center in the recess at the head end of the work and then to adjust the cutting tool lengthwise the lathe so as to register with the bearing to be turned, and to then adjust the tail-stock center.

This operation usually involves adjusting the position of the lathe tool for each individual crank shaft, and causes delay and waste of time.

In my improved invention the head-stock is as readily adjustable in and out as the tail-stock and the adjustment of the head-stock is accomplished without any liability of throwing the head-stock center out of line, or of permitting it to yield or spring when the tail-stock center is set up tight so as to bring thrust endwise upon the head-stock center. In other words, the head-stock center is rigidly supported and accurately aligned in whatever position it may be set.

My improved construction embodies improved means for easily and quickly adjusting the head-stock center in and out and for clamping it in any desired position.

With these and certain other objects in view which will appear later in the specifications, my improvement comprises the devices described and claimed and the equivalents thereof.

In the drawings, Fig. 1 is a part longitudinal section of a head-stock embodying my improvement.

Figure 2:
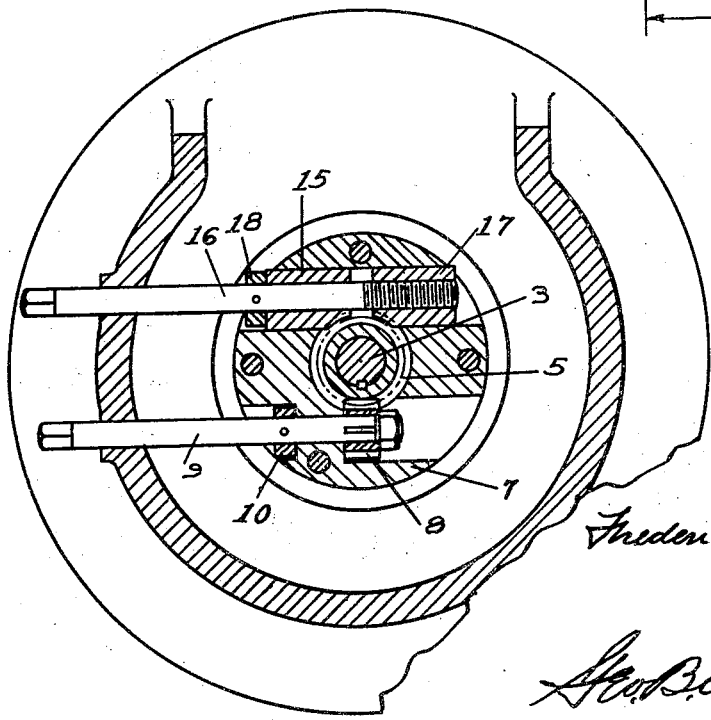

Fig. 2 is a vertical section on the line 2—2 of Fig. 1.

As is clearly shown in the drawings, the device consists in the usual lathe spindle 1 having a face-plate 2 and fitted with a lathe center 3.

My improved mounting for the lathe center 3 and the means for adjusting it in and out consists in a tapered sleeve 4 bored to slidingly receive the center 3. The center also slidingly travels through the bore of a worm wheel 5 to which it is secured by a feather way 6. The wheel 5 is mounted in a cylindrical housing 7 which may be bolted to face-plate 2, and the housing is also secured to the tapered sleeve 4.

A worm 8 fitted with a shaft 9 and thrust collar 10 is also carried by the housing and this worm when revolved will rotate the worm wheel 5 and the lathe center 3.

The tapered sleeve 4 is internally threaded as at 11, the threads preferably being blunt or half V-threads, the bore of sleeve 4 being internally ground to accurately receive the center 3 and the ends of the threads being also ground to the same diameter.

A threaded plug 12 is received in the threaded end of sleeve 4 and a transverse T-slot 13 is provided in the end of the plug to receive the square edged projection 14 on the end of center 3, which projection fits in the T-slot 13.

To clamp the worm wheel 5 and consequently lock the center 3 in any adjusted position I provide a clamp block 15 having a shaft 16 which is threaded on one end. A threaded plug 17 on the end of the shaft 16 and a thrust collar 18 is also provided on the shaft. When the shaft 16 is turned, the blocks 15 and 17 are drawn toward or away from each other in the recesses of housing 7 in which they are mounted. When drawn together the blocks bear against the worm wheel 5 and act as a lock or brake to prevent its turning.

Thus by turning shaft 16 the worm wheel 5 may be locked or anchored and by turning shaft 9 the center 3 may be adjusted in or outward with respect to the face-plate 2, but in any of its movements of adjustment the center 3 is kept properly in line and is rigidly supported by the threaded plug 12 against any end thrust which may be brought upon it.

By the means above described I have produced a simple, yet effective and relatively inexpensive device by which the head center of a lathe may be easily and quickly adjusted in or out and yet remain properly backed by the plug 12 which automatically moves the center 3 in and out when the center is rotated by means of worm wheel 5.

Having thus described my invention, what I claim and desire to secure by Letters Patent is:

In a lathe center, the combination of an internal hollow threaded sleeve, a lathe center rotatable with and longitudinally movable in said sleeve, a plug threaded in the bore of said sleeve and rotatably connected with said center, a housing secured to said face-plate, a worm wheel within said housing, said worm wheel feathered to said center, a worm engaging said wheel, means for rotating said worm and clamping means carried by said housing adapted to releasably clamp said worm wheel, for the purposes set forth.

In testimony whereof I affix my signature in presence of two witnesses.

FREDERICK S. FLOETER.

Witnesses:
U. M. SCHMIDT,
RICHARD E. SCHULZ.